Nov. 4, 1952 J. L. WAGNER ET AL 2,617,048

PHOTOELECTRIC INSPECTION DEVICE

Filed Jan. 9, 1948 2 SHEETS—SHEET 1

INVENTOR
J.L. WAGNER
R.H. HOLMWOOD
BY J. B. Sponsler
AGENT

PHOTOELECTRIC INSPECTION DEVICE

Filed Jan. 9, 1948 2 SHEETS—SHEET 2

INVENTOR
J.L. WAGNER
R.H. HOLMWOOD
BY J. B. Sponsler
AGENT

Patented Nov. 4, 1952 2,617,048

UNITED STATES PATENT OFFICE 2,617,048

PHOTOELECTRIC INSPECTION DEVICE

John L. Wagner, Endwell, and Richard H. Holmwood, Binghamton, N. Y., assignors to International Business Machines Corporation, New York, N. Y., a corporation of New York Application January 9, 1948, Serial No. 1,335

5 Claims. (Cl. 250—209)

Broadly the present invention is concerned with photoelectric devices for inspecting web materials capable both of transmitting and reflecting light in order to determine imperfections or irregularities in texture therein.

Particularly, however, this invention relates to a paper inspecting device capable of use with a record card printing machine of the type shown in U. S. Patent 2,181,935.

The well known Hollerith tabulating card requires both precision and quality manufacture, particularly when it is used in business machines where it is sensed by electrical means. Paper stock from which these cards are made is carefully selected; however, in order to insure record cards as near perfection as high speed production methods will permit, inspection of the card or the paper stock is also essential. Normally this inspection consists in pre-sensing the stock by electrical means for discovering conductive particles or unwanted perforations which, being permitted to remain in the finished record card, might result in accounting machine errors. Beyond these defections, however, certain other imperfections, sometimes referred to as "slime spots," are encountered in record cards. Slime spots, being non-conductive, are not sensed by the normal electrical pre-sensing of the paper stock; in fact, frequently the slime spot does not contribute its element of accounting machine error until the record card has been used in a record controlled machine a few times. Slime spots appear as blisters in a record card, and consist, for the most part, of brittle areas caused by particles of fermented paper fibres forming on the paper manufacturing machinery and becoming imbedded in the paper stock. After the paper is severed into pieces to form record cards, and particularly after these cards are fed through card feeding mechanism, the blisters may rupture and holes may result which are equivalent to card perforations, thereby providing a source of false card data, or perhaps bringing about a jam of the record cards being fed. In this connection slime spots are more objectionable than conductive particles.

Formerly slime spots were detected by visual inspection, and later by standard photoelectric circuits wherein light transmitted through the paper stock impinged on a photocell thereby varying its output when slime spots occurred. Another photoelectric arrangement, more recently used for detecting slime spots and the like, is shown in U. S. Patent 2,244,228. The present invention is a further improvement for the detection of slime spots and the like utilizing photoelectric cells; however, as later explained herein, certain changes and improvements in tabulating card manufacturing have brought about requirements for sensing slime spots heretofore not demanded.

Previously all card inspecting equipment, i. e. slime spot detectors and electrical pre-sensing devices, was applied to the card stock upon the paper slitters where the stock was fed past the slitter knives at relatively low speed. The detection of an imperfection with that arrangement brought about the actuation of a stripping mechanism which marked the paper stock leaving the slitter. Thereafter, the strips of card stock were severed into card lengths and printed, the operator leafing through each stack of cards thus produced and scanning for those which were stripped for purposes of rejecting them manually. More recently, however, new and improved paper slitters have been utilized wherein the slitting speed was increased 4 to 8 times that of former slitters so that previous methods for indicating card imperfections have become impractical. Currently, the practice in the production of record cards consists of slitting the paper stock into card width rolls and then feeding each of these rolls into a card printing machine wherein the stock is inspected for imperfections and certain apparatus actuated whereby finished record cards containing conductive specks or slime spots are automatically rejected. Primarily, therefore, the subject invention is concerned with devices in card printing machines for rejecting record cards in which slime spots have been detected.

Another object of this invention is to provide a photoelectric sensing device for inspecting paper stock, and the like, wherein variations in the texture of the stock are compensated for automatically without producing false indications of imperfections.

A still further object of the present invention is to provide a photoelectric paper inspecting device wherein inspection is unaffected by variations in the paper thickness.

Other objects of the invention will be pointed out in the following description and claims and illustrated in the accompanying drawings, which disclose, by way of example, the principle of the invention and the best mode, which has been contemplated, of applying that principle.

Figure 1:
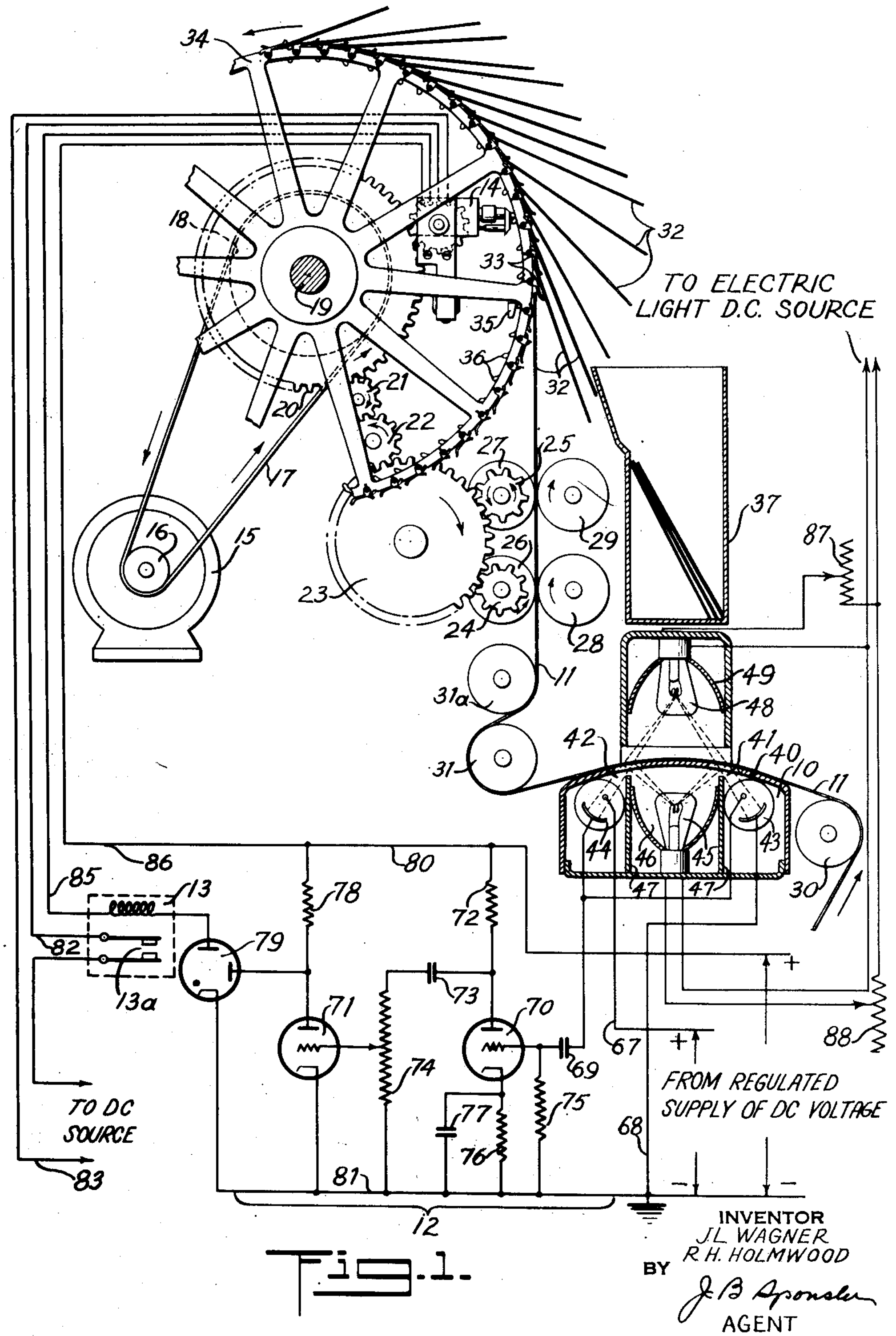
Fig. 1 is a diagrammatic view of the inspecting device, together with a circuit diagram of the photocell amplifier and other electrical circuits necessary to the operation of the device.

Referring to Fig. 1 of the drawings the principal components of the invention are illustrated; namely, a photoelectric unit 10 for detecting slime spots, in a paper stock card strip 11, an electronic amplifier 12 having an output relay 13, and a card ejector mechanism 14. These components are applied to a card printing machine similar to that disclosed in U. S. Patent 2,181,935, previously referred to, and of which certain elements are included in the drawing of Fig. 1. Briefly the card printing machine equipped with the additional components of the present invention operates as follows: A motor 15 via a pulley 16 and belt 17 turns another pulley 18 in a counterclockwise direction. The pulley 18 is fixed to a shaft 19 to which is fixed a gear 20 which drives a train of gears 21, 22, 23. The gear 23 engages and drives gears 24 and 25 which are fixed to feed rolls 26 and 27, respectively. The strip 11 is pulled from a supply roll (not shown) by the action of the feed rolls 26 and 27 and their cooperating idler rolls 28 and 29, respectively, over an idler roll 30, over the photoelectric unit 10, over the idlers 31 and 31*a* between the rolls 26 and 28 and between the rolls 27 and 29. Normally the rolls 26 and 28 are provided with print cylinders (not shown) and a cutter (not shown) is provided with the rolls 27 and 29 for severing the strip 11 in card lengths to form the cards 32. The severed portion of the strip or card 32 is fed upwards until it engages a clip 33 pivotally mounted on and spring urged against the periphery of a carrier drum 34, which is fixed to the shaft 19 and is turned in a counterclockwise direction thereby. A fixed cam 35 engages the tail 36 of each clip 33, as the drum 34 rotates, and pivots the clip 33 (see also in Fig. 2) to receive a card 32, the clip thereafter engaging and retaining the card 32 against the drum 34. (The operation of the above mentioned mechanism is discussed in greater detail in U. S. Patent 2,181,935, but is repeated herein to provide a better understanding of the subject invention.) When a slime spot is detected in the strip 11 by the photoelectric unit 10, an electrical signal is transmitted to the electronic amplifier 12 which operates the relay 13 to control the ejector mechanism 14 to open a clip 33 carrying a card 32 containing the slime spot and to forcibly eject the card from the clip 33 into a reject hopper 37 (see Fig. 1) which is positioned to receive the rejected card. The time constants of the electrical and mechanical components are so correlated that a slime spot detected in the strip 11 at the photoelectric unit 10 is eliminated by the ejection of the record card 32 then containing it as the drum 34 presents the card to the ejector mechanism 14.

Referring again to Fig. 1, and in particular to the photoelectric unit 10, it will be evident that the strip 11 is fed over a curved member 40 containing slots 41 and 42 transverse to the strip 11. Mounted within the unit 10 are two photoelectric cells 43 and 44 and a light source 45, these being arranged so that light from the source 45 is reflected from the surface of the strip 11 at each of the slots 41 and 42 to the photoelectric cells 43 and 44 respectively, aided by a reflector 46. Two light baffles 47 are provided to prevent light from entering directly into the photoelectric cells 43 and 44 from the source 45. A second light source 48 is provided in a mounting directly above the first light source 45, and is equipped with a reflector 49. Light is transmitted from the source 48 through the strip 11 at each of the slots 41 and 42 to the photoelectric cells 43 and 44 respectively. It is apparent that the strip 11 will be scanned by both photoelectric cells 43 and 44 as it is fed over the slots 41 and 42, respectively, not only as a result of light from source 45 reflected from the strip, but also as a result of light from source 48 transmitted through the strip. It is obvious also that any variation in the strip 11, for example, a slime spot passing the slots 41 and 42, will vary the amount of light transmitted or reflected into the photoelectric cells 43 and 44.

Figures 2, 3:
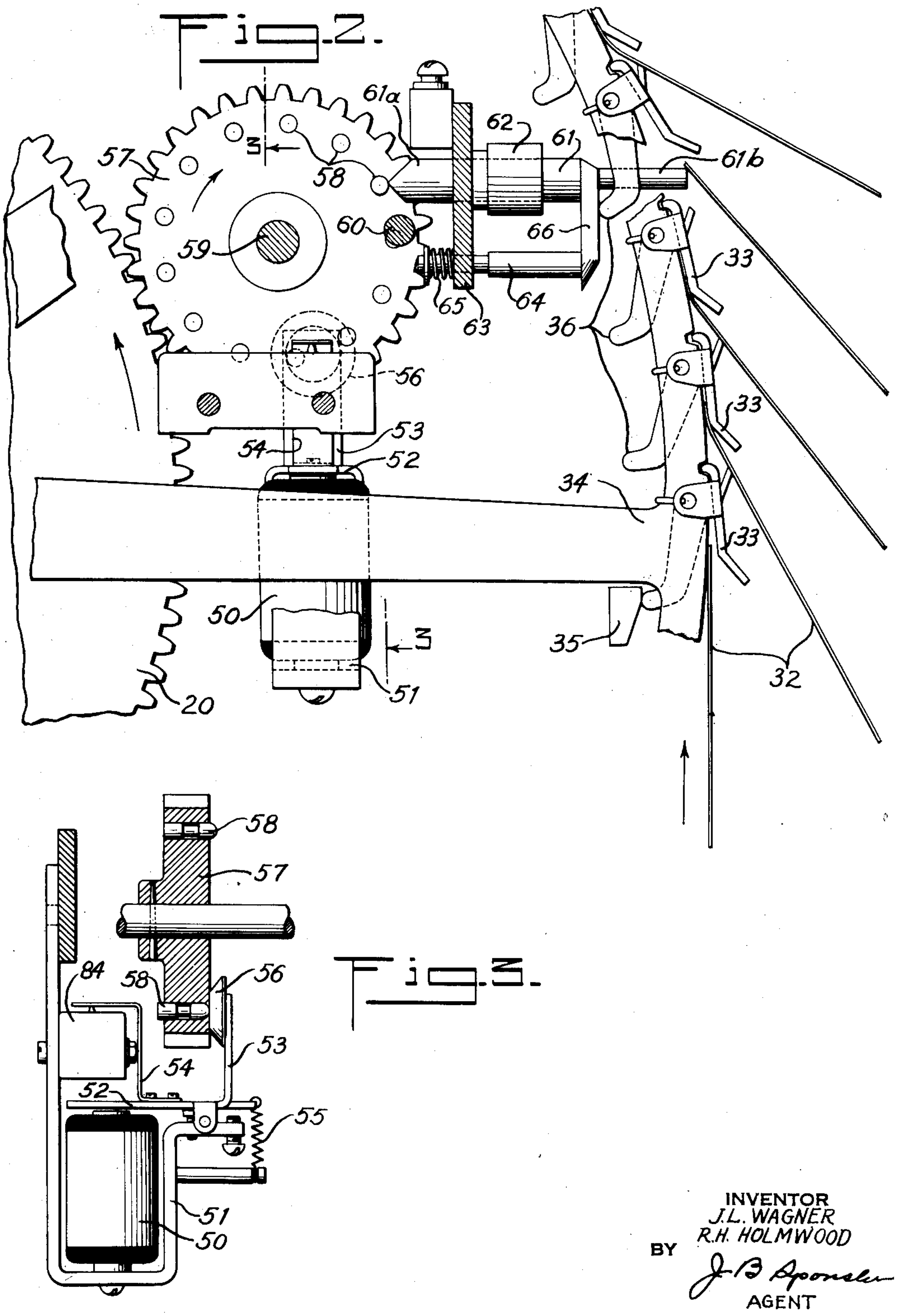
Fig. 2 illustrates a partial diagrammatic view of the card rejector unit.
Fig. 3 is a partial sectional view of the card ejector unit taken along the line 3—3 of Fig. 2.

The card ejector mechanism 14 (Fig. 1) is shown in detail in Figs. 2 and 3, and includes an electromagnet 50 mounted in a yoke 51 carrying an armature 52 having an arm 53 and an auxiliary arm 54. A spring 55 normally biases the armature 52 away from the pole face of the electromagnet 50. On the extremity of the arm 53 is attached a cam disc 56 which coacts with a gear 57 carrying a plurality of pins 58 spaced equidistant from a shaft 59 to which the gear 57 is fixed and equally spaced around the face of the gear near its root circle. The pins 58 are slidably mounted transversely in the gear 57 and are of greater length than its thickness. Normally these pins are cammed in a position (as shown by the pin 58 at the top of the gear 57 in Fig. 3) by a tapered cam 60 bearing against one face of the gear 57 as the gear is rotated by the gear 20 which drives it. When the electromagnet 50 is energized, however, the disc 56 is forced against the other face of the gear 57 by the action of the armature 52, thereby camming a pin 58 so that it protrudes from the opposite face of the gear 57 (as shown by the pin 58 at the bottom of the gear 57 in Fig. 3).

Also coacting with the gear 57 and the pins 58 is a plunger 61 slidably supported in a bearing 62 which is attached to a bracket 63 mounted upon the card printing machine and arranged so that a tip 61*a* engages any pin 58 which has been cammed from its normal position by action of the disc 56. The bracket 63 also holds a plunger 64 which is slidably supported therein and biased normally against the bracket by a spring 65. A circular plate 66 is fastened to the plungers 61 and 64, an extension 61*b* of the plunger 61 passing through the plate which has its edges chamfered. The extension 61*b* and the plate 66 are arranged normally not to interfere with the clips 33 or the cards 32 on the carrier drum 34 by the action of the spring 65. However when a pin 58 is made to project (as shown by a pin 58 in the lower part of the gear 57 of Fig. 3) the plunger 61 will be cammed to the right (as shown in Fig. 2) as the gear 57 is rotated clockwise due to the camming action of the pin 58 upon the tip 61*a*. Consequently the plate 66 engages the tail 36 of a clip 33 thereby releasing the card 32 normally retained against the carrier drum 34 by the clip 33 and at the same time the extension 61*b* contacts and pushes the card 32 to eject is forcibly. Thereafter as the gear 57 continues to rotate and the pin 58 will be cammed into its normal position by the cam 60.

The electronic amplifier 12 is illustrated in the electrical circuit shown in the lower half of Fig. 1. The photoelectric cells 43 and 44 are electrically connected to the amplifier 12 via the connections shown so that the anode of cell 44 is connected to the positive terminal of a direct current supply (not shown) via a conductor 67 and the cathode of cell 44 is connected to the anode of cell 43 of which the cathode is connected to ground via conductor 68. The common connection of the cells 43 and 44 is connected via a capacitor 69 to the control grid of a vacuum tube 70 which is resistance coupled to another tube 71 in the conventional manner via a load resistor 72, a capacitor 73, and a potentiometer 74, which also regulates the amplifier sensitivity. An input resistor 75 is provided for the tube 70 which is self biased to be normally non-conductive by the cathode resistor 76 having a by-pass capacitor 77. The tube 71 is normally conductive and is provided with a load resistor 78. A gas tube 79 is coupled to the tube 71 so that when the latter becomes non-conductive its increased potential drop will be sufficient to energize the former to become conductive and to energize the relay 13. The anodes of the tubes 70, 71, and 79 are energized via line 80 which is connected to the positive side of a second direct current supply (not shown) which has its negative side connected to the grounded line 81. When relay 13 is energized its contacts 13*a* complete a circuit from a third direct current supply (not shown) to the solenoid 50 (see Fig. 3) via conductors 82 and 83. Simultaneously the operation of solenoid 50 causes the arm 54 (Fig. 3) to operate a microswitch 84 which is connected in series with the relay 13, via conductors 85 and 86, thereby opening the work circuit of tube 79.

Normally the amplifier, connected as shown and as described above, is adjusted so that the tubes 70 and 79 are not conducting and tube 71 is conducting, the latter upon being rendered non-conductive causing tube 79 to conduct. When a slime spot of darker color than the paper strip 11 enters over the slot 41, the amount of light falling upon the cell 43 is reduced and the cell becomes less conductive thereby increasing the potential across it and providing a positive pulse to capacitor 69 which causes tube 70 to conduct, tube 71 to become non-conductive to energize tube 79 to conduct and relay 13 to be energized. The relay contacts 13*a* therefore close and energize solenoid 50 so that the pin 58 opposite the disc 56 is forced to protrude from the gear 57, as previously described. The pin 58, after gear 57 rotates approximately 270 degrees, thereafter engages the tip 61*a* of plunger 61 which ejects a card 32 from its position upon the drum 34 and a clip 33. The time period of these operations is arranged to coincide with the period required for a point of the strip 11 to pass from the center of the photoelectric unit 10 to a position opposite the ejector mechanism 14 (see Fig. 1) so that the card ejected carries the slime spot detected.

When a dark colored slime spot enters over the slot 42 the light to the cell 44 is reduced and its resistance increases so that a negative pulse is supplied to capacitor 69 and no operation of the amplifier 12 occurs.

When a slime spot of lighter color than the paper strip 11 enters over the slot 41 the light falling on cell 43 is increased and its resistance is reduced and its potential drop reduced so that a negative pulse is supplied to capacitor 69 and no amplifier operation occurs. However when a light colored or transparent spot enters over the slot 42 the light to the cell 44 is increased and its resistance reduced so that a positive pulse is supplied to the capacitor 69, thereby operating the amplifier to cause the train of events to occur leading to the ejection of the card 32 containing the slime spot, as previously described.

It is to be noted that the device is in no way limited merely to the detection of slime spots, since any sudden variation in the paper strip 11 causing a change in the amount of light falling into the cells 43 and 44 will bring about an operation of the amplifier 12 in the manner already described. Consequently, dark or light marks, holes, or breaks in the strip 11 will bring about similar action and ejection of the cards 32 ultimately containing them. For that reason paper stock of non-uniform cross section or thickness has a tendency to cause operation of the device. It is well known, however, that where thicknesses in paper stock vary the calendering process tends to produce more gloss on the areas of greater thickness. Advantage of this fact is taken in the present invention by providing both a transmitted and a reflected source of light for energizing the photoelectric cells. Hence where the paper stock is thicker less light will be transmitted therethrough; however, since the calendering produces more gloss in such areas, the unique arrangement of light sources shown will produce a compensating increase of reflected light so that the total light falling upon the photoelectric cells will remain substantially constant. The light compensating feature is further refined by varying respectively the intensities of the light sources 45 and 48. This may be accomplished by using electric lamps of different ratings of illumination, by the insertion of resistance in their circuits, by masks, by spacing the sources, or by any well known means. The variable resistors 87 and 88 in the light supply lines of Fig. 1 illustrates specifically one method by which the respective light intensities of the sources 45 and 48 may be varied.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A photoelectric web inspecting device comprising means for feeding a light permeable web of varying thickness calendered to its thinnest dimension and containing occasional discrete areas of greater or lesser light permeability, means for detecting the said discrete areas consisting of a pair of light responsive components and a pair of light emitting components, the first said pair being disposed adjacent one surface of the web and the second said pair disposed one adjacent either surface of the web and arranged so that light from one of the second pair falls across the path of feed of the web into each of the first pair and light from the other of the second pair is reflected from the web into each of the first pair, means for setting the intensities of the said light emitting components for maintaining the total light falling into each light responsive component substantially constant as the thickness of the web varies, and means responsive to one of the light responsive components when the light falling thereinto is interrupted by a discrete area of greater light permeability and to the other of the light responsive components when the light falling thereinto is interrupted by a discrete area of lesser permeability.

2. A photoelectric web inspecting device comprising means for feeding a web of light permeable material wherein discrete areas of less light permeable or more light permeable occur, means for detecting the said areas consisting of a pair of photoelectric cells disposed on one side of the web and light sources disposed on both sides of the web, one said source reflecting light from the web into each photoelectric cell and the other source transmitting light through the web into each photoelectric cell, and an amplifier responsive to one of said cells when the light impinging thereon is varied due to the presence in the web of a said area of less light permeability and to the other of said cells when the light impinging thereon is varied due to the presence in the web of a said area of more light permeability.

3. In apparatus for inspecting a web having both light reflecting and light transmitting properties, a pair of photocells disposed along one surface of the said web, a first light source providing light reflected from the said surface into both the said photocells, a second light source providing light transmitted through the said web to both the said photocells, and an electrical circuit, co-acting with the said photocells, so that when the quantity of transmitted light exceeds the quantity of reflected light current flows in one of the said photocells and when the quantity of reflected light exceeds the quantity of transmitted light current flows in the other of said photocells.

4. Web inspecting apparatus comprising a pair of photocells displaced along a predetermined path through which a web is fed, a first light source providing light reflected from a common surface of said web into each said photocell, a second light source providing light transmitted through the said web to each said photocell, and an electrical circuit including the said photocells for differentiating the amount of transmitted light with respect to the amount of reflected light in the respective photocells.

5. Web inspecting apparatus comprising a pair of photocells displaced along a predetermined path through which a web is fed, a first light source providing light reflected from a common surface of said web into each said photocell, a second light source providing light transmitted through the said web to each said photocell, and an electrical circuit including the said photocells for differentiating the amount of reflected light with respect to the amount of transmitted light in the respective photocells.

JOHN L. WAGNER.
RICHARD H. HOLMWOOD.

REFERENCES CITED

The following references are of record in the file of this patent:

UNITED STATES PATENTS

| Number | Name | Date |
|---|---|---|
| 1,828,894 | Freygang | Oct. 27, 1931 |
| 2,138,645 | Rey | Nov. 29, 1938 |
| 2,222,429 | Briebecker | Nov. 19, 1940 |
| 2,251,613 | Kott | Aug. 5, 1941 |
| 2,258,109 | Carroll | Oct. 7, 1941 |
| 2,429,331 | Sachtleben | Oct. 21, 1947 |
| 2,433,685 | Dowell | Dec. 20, 1947 |
| 2,438,588 | Tolson | Mar. 30, 1948 |
| 2,513,349 | Nase | July 4, 1950 |

FOREIGN PATENTS

| Number | Country | Date |
|---|---|---|
| 86,831 | Sweden | July 14, 1936 |